US011345620B2

(12) United States Patent
Zhu et al.

(10) Patent No.: US 11,345,620 B2
(45) Date of Patent: May 31, 2022

(54) DISC-TYPE ELECTROCATALYTIC WATER TREATMENT DEVICE

(71) Applicant: Shaanxi University of Science & Technology, Xi'an (CN)

(72) Inventors: Yunqing Zhu, Xi'an (CN); Hongrui Ma, Xi'an (CN); Junfeng Niu, Xi'an (CN)

(73) Assignee: Shaanxi University of Science & Technology, Xi'an (CN)

( * ) Notice: Subject to any disclaimer, the term of this patent is extended or adjusted under 35 U.S.C. 154(b) by 272 days.

(21) Appl. No.: 16/672,340

(22) Filed: Nov. 1, 2019

(65) Prior Publication Data

US 2020/0165149 A1    May 28, 2020

(30) Foreign Application Priority Data

Nov. 22, 2018  (CN) .......................... 201811398618.2
Nov. 22, 2018  (CN) .......................... 201821931549.2

(51) Int. Cl.
*C25B 9/17*  (2021.01)
*C02F 1/461*  (2006.01)
*C02F 1/467*  (2006.01)

(52) U.S. Cl.
CPC ........ *C02F 1/46109* (2013.01); *C02F 1/4672* (2013.01); *C02F 1/4676* (2013.01); *C02F 2001/46152* (2013.01); *C02F 2201/003* (2013.01); *C02F 2201/004* (2013.01)

(58) Field of Classification Search
CPC .... C25B 9/17; C25B 1/04; C25B 9/00; C25B 15/00; C25B 9/63; C25B 9/70; C25B 11/00; C25B 9/65; C25B 9/40
See application file for complete search history.

(56) References Cited

U.S. PATENT DOCUMENTS

| 2,255,429 A | * | 9/1941 | Lyons | ..................... C04B 33/30 |
| | | | | 204/212 |
| 2015/0247248 A1 | * | 9/2015 | Thomassen | ............. C02F 1/463 |
| | | | | 205/743 |
| 2018/0099881 A1 | * | 4/2018 | Fryda | .................. C02F 1/46109 |

* cited by examiner

*Primary Examiner* — Zulmariam Mendez
(74) *Attorney, Agent, or Firm* — Novoclaims Patent Services LLC; Mei Lin Wong

(57) ABSTRACT

A disc type electrocatalytic water treatment device, characterized in that: comprising: a housing having a water inlet and a water outlet, a plurality of cathode plates and anode plates sequentially and alternately stacked inside the housing, a central shaft passes through central holes of the cathode plates and anode plates and compress the cathode plates to form a disc-shaped structure while the cathode plate and the anode plate are separated at the central holes. A wastewater to be treated is guided to enter from the water inlet, flow inwardly and outwardly to sequentially pass through the cathode plate and the anode plate such that a passage route is formed, and finally flows out from the water outlet.

18 Claims, 2 Drawing Sheets

DISC-TYPE ELECTROCATALYTIC WATER TREATMENT DEVICE

BACKGROUND OF THE PRESENT INVENTION

Field of Invention

The present invention relates to water treatment, and more particularly to a disc type electrocatalytic water treatment device.

Description of Related Arts

Electrocatalytic water treatment technology is an efficient water treatment technology for rapid oxidation and removal of organic pollutants, and has broad application prospects. The basic principle of electrocatalytic water treatment technology is to reduce or remove pollutants from wastewater by direct electrochemical reaction or indirect electrochemical conversion. It can be divided into direct electrolysis and indirect electrolysis. Direct electrolysis refers to the removal of pollutants from the wastewater by direct oxidation or reduction on the electrodes. Indirect electrolysis refers to the use of electrochemically generated redox species (such as strong oxidizing chlorate, hypochlorite, $H_2O_2$ and $O_3$, and free radicals such as solventized electrons, .HO, .$HO_2$) as reactants or catalysts to convert pollutants into less toxic substances. The electrocatalytic treatment technology has the characteristics of versatility, high flexibility, no pollution or less pollution, and easy control. At the same time, the equipment is small, the land occupation is small, the operation management is simple and the treatment effect is good. Thus, it gained more and more attention from people. However, due to its shortcomings such as high power consumption and unstable effects, its wide application is hindered. Seeking energy-efficient and highly-efficient electrocatalytic water treatment technology and equipment has become an important direction in the research of electrochemical application technology.

SUMMARY OF THE PRESENT INVENTION

In order to overcome the disadvantages of the conventional arts as described above, an object of the present invention is to provide a disc-type electro-catalytic water treatment device. The results of treating the high-salt wastewater in the oil field show that the method has good electro-catalytic oxidation ability and can significantly improve the chromaticity and COD removal efficiency in the wastewater, so that the effluent can reach the first-level standard of integrated wastewater discharge.

In order to achieve the above object, the present invention is implemented by the following technical solutions:

A disc type electrocatalytic water treatment device, comprising: a housing (7) having a water inlet (12) and a water outlet (11), a plurality of cathode plates (8) and anode plates (9) sequentially and alternately stacked inside the housing (7), wherein each of the cathode plate (8) and anode plate (9) has a central hole (22), a central shaft (16) passes through the central hole to position and compress the cathode plates (8) and the anode plates (9) to form a disc-shaped structure and to separate the cathode plate (8) and the anode plate (9) at the central hole (22), thereby a waste water to be treated is guided to enter from the water inlet (12), flow inwardly and outwardly to sequentially pass through the cathode plate (8) and the anode plate (9) such that a passage route is formed, and finally flows out from the water outlet (11).

The cathode plate (8) has an outer diameter greater than an outer diameter of the anode plate (9), the cathode plate (8) has a plurality of passage holes (23) such that the waste water to be treated flows in from the water inlet (12) and sequentially passes through the passage holes (23) and the outer edges of the anode plate (9) to form the passage route, and then flows out from the water outlet (11).

The cathode plate (8) has an outer edge (81) with a protruded portion (811), the outer edges of two adjacently positioned cathode plates (8) are pressed to connect together through the protruded portions (811) to form an enclosed cavity (82), and the anode plate (9) is positioned inside the enclosed cavity (82).

Alternately, the cathode plate has an outer diameter smaller than an outer diameter of the anode plate, the anode plate has a plurality of passage holes such that the waste water to be treated flows in from the water inlet and sequentially passes through the passage holes and the outer edges of the cathode plate to form the passage route, and then flows out from the water outlet.

The anode plate has an outer edge with a protruded portion, the outer edges of two adjacently positioned anode plates are pressed to connect together through the protruded portions to form an enclosed cavity, and the cathode plate is positioned inside the enclosed cavity.

The central shaft (16) is a conductor, and a portion of the central shaft (16) which is located in the housing (7) is covered with an insulating washer (14), wherein the anode plate (9) is secured into position through the central shaft (16) and is sealed by a second sealing ring (10) and an insulation ring (17), and is electrically connected through connecting to a copper ring (18) to form an anode conductive loop.

A conductive washer (15) is disposed between the insulating washer (14) and the central shaft (16), and the anode plate (9) penetrates through the insulating washer (14) to connect to the conductive washer (15) to form the anode conductive loop.

A portion of the insulating washer (14) corresponding to the disc-shaped structure is provided with a second sealing ring (10), a first sealing ring (6) is provided between the end cap (5) and an inner wall of the housing (7), the first sealing ring (6) is a lip seal which fills in a groove of the end cap (5), the central shaft (16) has one end mounted with a sealing nut (1), an anode crimping washer (2) is disposed between the sealing nut (1) and the central shaft (16), an outer side of a portion of the central shaft (16) at the housing (7) is sleeved with an insulating sleeve (3) and an insulating washer (4), the insulating washer (4) is positioned between the insulating sleeve (3) and the conductive washer (15).

The second sealing ring (10) is made of PVC, plastic, silicone rubber or tetrafluoroethylene, the insulating washer (14) is made of PVC, plastic, silicone rubber or tetrafluoroethylene, the conductive washer (15) is made of copper, stainless steel, aluminum or titanium, the first sealing ring (6) is made of PVC, plastic, silicone rubber or tetrafluoroethylene, the cathode plate (8) is made of stainless steel, aluminum or titanium, the anode plate (9) is made of iridium oxide, ruthenium oxide, iridium-ruthenium alloy oxide, platinum-iridium-ruthenium alloy oxide, lead oxide, antimony-tin oxide or platinum coated titanium electrode, the anode plate (9) is non-porous anode plate or porous anode plate.

The waste water to be treated is guided to flow through the passage holes peripheral to the central hole of the cathode plate (8) at the uppermost position or the anode plate (9) at the uppermost position in an in-and-out and downwardly manner, the water outlet (11) is positioned at a bottom of the housing (7).

Compared with the existing arts, the present invention has the following advantageous technical effects:

1. By using a disc structure, the electrode loading area per unit volume is increased.

2. The spacing between electrodes is reduced significantly, the reaction mass transfer efficiency and reaction path are increased, and the efficiency of electrocatalytic oxidation is increased.

3. The electrocatalytic anode plate and the cathode plate are alternately arranged inside the housing of the disc-type electrocatalytic water treatment device to form an in-and-out flow route which can increase the reaction time. The electrocatalytic electrode adopts a disc type arrangement of the electrocatalytic anode plate and the cathode plate, which increases the electrode placement density, thereby enhancing the reaction efficiency, and is beneficial to realize the application of the electrocatalytic oxidation technology in the actual water treatment process.

BRIEF DESCRIPTION OF THE DRAWINGS

The present invention is described in further detail with the accompanying drawings and embodiments as follows.

DETAILED DESCRIPTION OF THE PREFERRED EMBODIMENT

The present invention is described in further detail below with reference to specific embodiments.

Figure 1:
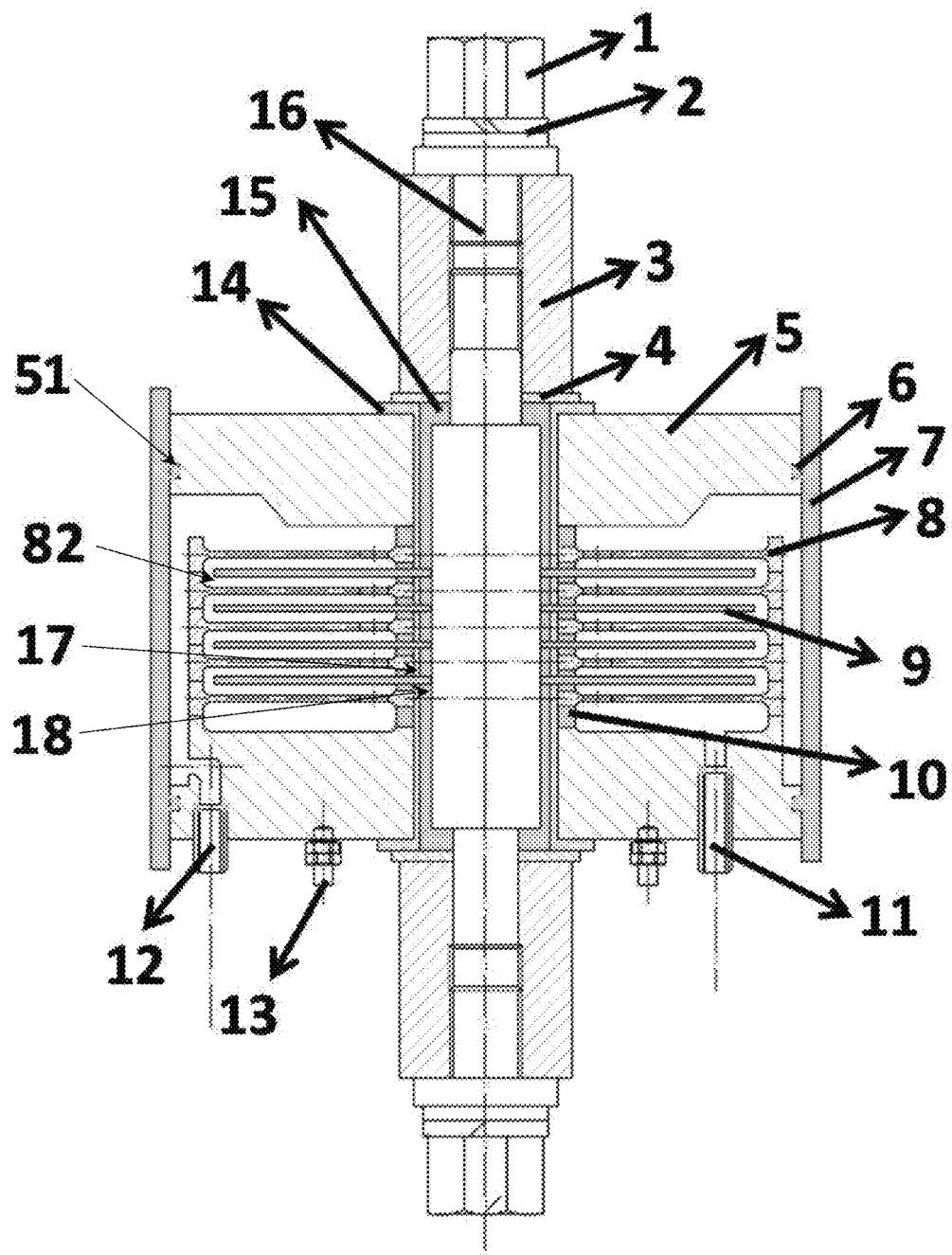
FIG. 1 is a schematic view showing the structure of the device of the present invention.

Referring to FIG. 1 of the drawings, a disc-type electrocatalytic water treatment device of the present invention includes a housing 7, a water inlet 12 and a water outlet 11 provided on the housing 7, a plurality of cathode plates 8 and anode plates 9 sequentially and alternately stacked inside the housing 7, wherein each of the cathode plate 8 and anode plate 9 has a central hole 22, a central shaft 16 passes through the central hole 22 to position and compress the cathode plate 8 and the anode plate 9 to form a disc-shaped structure and to separate the cathode plate 8 and the anode plate 9 at the central hole 22.

Figure 2:
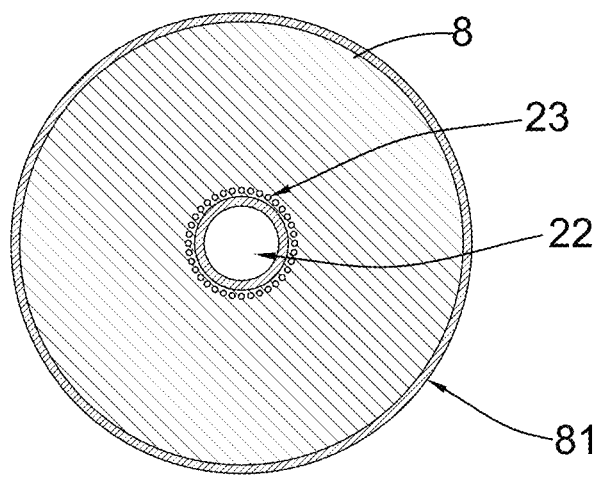
FIG. 2 is a top view showing the cathode plate of the device of the present invention.
Figure 3:
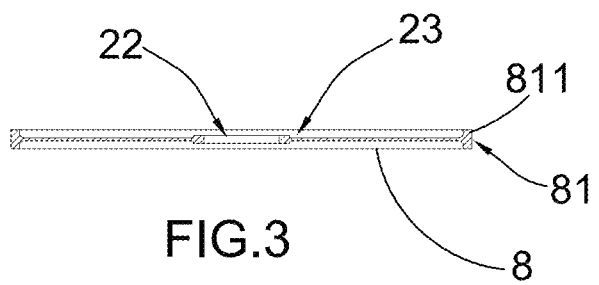
FIG. 3 is a sectional view showing the cathode plate of the device of the present invention.
Figure 4:
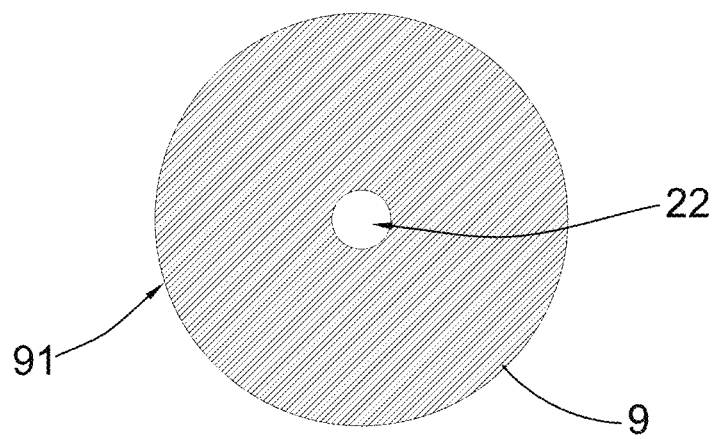
FIG. 4 is a top view showing the anode plate of the device of the present invention.

Referring to FIG. 2, FIG. 3 and FIG. 4 of the drawings, the cathode plate 8 has an outer diameter greater than an outer diameter of the anode plate 9. The cathode plate 8 has a plurality of passage holes 23 along a peripheral edge of the central hole 22 and an outer edge 81 having a protruded portion 811. The outer edges 81 of each adjacent cathode plates 8 are fittingly connected together through the protruded portion 811 to form an enclosed cavity 82 therebetween. Each of the anode plates 9 is located inside the enclosed cavity 82 between two adjacent cathode plates 8 respectively.

The waste water to be treated enters through the water inlet 12 to reach the uppermost cathode plates 8, and passes through the passage holes 23 of the cathode plate 8 and flows outwardly to an outer edge 91 of the uppermost anode plate 9 and then flows inwardly until reaching the passage holes 23 of the next cathode plates 8 such that a passage route is formed. Finally, the waste water to be treated flows out from the water outlet 11, which is communicating with the bottommost cathode plate 8 and is positioned at a bottom side of the housing 7.

Alternately, according to a second embodiment, the structure of the cathode plates 8 and the anode plate 9 are reversed. That is the cathode plate 8 has the structure as shown in FIG. 4 and the anode plate 9 has the structure as shown in FIGS. 2 and 3. In particular, the cathode plate 8 has an outer diameter slightly smaller than an outer diameter of the anode plate 9. The anode plate 9 has a plurality of passage holes and an outer edge having a protruded portion. The outer edges of each adjacent anode plates 9 are fittingly connected together through the protruded portion to form an enclosed cavity therebetween. Each of the cathode plates 8 is located inside the enclosed cavity between two adjacent anode plates 9 respectively.

According to this second embodiment, the waste water to be treated enters through the water inlet 12 to reach the uppermost anode plate 9, and sequentially passes through the edges of the uppermost cathode plate 8 and the passage holes of the anode plate 9 to form a passage route, and flows out from the water outlet 11, which is communicating with the bottommost anode pressing plate 9 and is positioned at a bottom side of the housing 7.

According to the present invention, the central shaft 16 is a conductor, and a portion of the central shaft 16 located in the housing 7 is covered with an insulating washer 14. A portion of the insulating washer 14 corresponding to the disc-shaped structure is provided with a second sealing ring 10. The anode plate 9 is secured into position through the central shaft 16. Preferably, the anode plate 9 is mounted and sealed by the second sealing ring 10, an insulation ring 17 and a copper ring 18, and the anode plate 9 is electrically connected through connecting to the copper ring 18 to form an anode conductive loop. The cathode plate 8 is located outside the insulating washer 14. An end cap 5 with a cathode crimping bolt 13 is provided at one or two ends of the disc-shaped structure of the housing 7. A first sealing ring 6 is provided between the end cap 5 and an inner wall of the housing 7. The first sealing ring 6 is a lip seal which fills in a groove 51 of the end cap 5. The cathode plate 8 is connected to the end cover 5 by mechanical pressing, and is connected to the power source through the cathode crimping bolt 13 to form a cathode conductive loop.

Preferably, a conductive washer 15 may be disposed between the insulating washer 14 and the central shaft 16, and the anode plate 9 penetrates through the insulating washer 14 and the conductive washer 15 to form the anode conductive loop.

The central shaft 16 has one end mounted with a sealing nut 1. An anode crimping washer 2 is disposed between the sealing nut 1 and the central shaft 16. An outer side of a portion of the central shaft 16 at the housing 7 is sleeved with an insulating sleeve 3 and an insulating washer 4. The insulating washer 4 is positioned between the insulating sleeve 3 and the conductive washer 15.

According to the present invention, the positions of the cathode plate 8 and the anode plate 9 can be interchanged, and the roles of accessories of the anode and cathode can also be changed accordingly.

According to the present invention, the second sealing ring 10 is made of PVC, plastic, silicone rubber or tetrafluoroethylene. The insulating washer 14 is made of PVC, plastic, silicone rubber or tetrafluoroethylene. The conductive washer is made of copper, stainless steel, aluminum or titanium. The first sealing ring 6 is made of PVC, plastic, silicone rubber or tetrafluoroethylene. The cathode plate 8 is made of stainless steel, aluminum or titanium. The anode plate 9 is made of iridium oxide, ruthenium oxide, iridium-ruthenium alloy oxide, platinum-iridium-ruthenium alloy oxide, lead oxide, antimony-tin oxide or platinum coated titanium electrode. The anode plate 9 is non-porous anode plate or porous anode plate.

According to the present invention, the entire reaction device is press tight and sealed by the sealing nut 1 to form a closed and sealed system, the specific operation is as follows:

(a) External power source acts on the anode plate 9 through the anode crimping washer 2, and the cathode crimping bolt 13 acts on the cathode plate 8.

(b) Utilize a multi-stage centrifugal pump to pump salt-containing industrial wastewater (electrocatalytic wastewater) into the water inlet 12 at a flow rate of 1-5 m/s, and the fluid flows through the passage holes peripheral to the central hole of the cathode plate 8 to form an in-and-out circulating flow.

(c) Adjust an applied electric field voltage to 1-10.0V and a current density to 5-60 mA/cm$^2$.

(d) Take a sample from the water outlet 11 after 1 hour of stable operation and detect water color, ammonia nitrogen, and COD indicators.

The following are a few specific examples.

Exemplary Embodiment 1

Treatment of salt-containing industrial wastewater by disc-type electrocatalytic reactor with titanium anode having coating of ruthenium oxide (a) The cathode plate 8 is a stainless steel cathode platen, and the anode plate 9 is a titanium anode with coating of ruthenium oxide.

(b) Utilize a multi-stage centrifugal pump to pump salt-containing industrial wastewater into the water inlet 12 at a flow rate of 1 m/s, and the fluid flows through the passage holes peripheral to the central hole of the cathode plate 8 to form in-and-out circulating flow.

(c) Adjust an applied electric field voltage to 2.0V and a current density to 10 mA/cm$^2$.

(d) Take a sample from the water outlet 11 after 1 hour of stable operation and detect water color, ammonia nitrogen, and COD indicators.

For the inlet water, the COD is 483 mg/L and the ammonia nitrogen is 232 mg/L. After treatment, the chromaticity in the water can be completely removed, the effluent COD is reduced to 40 mg/L, and the ammonia nitrogen is reduced to 1 mg/L, reaching the first-level standard for comprehensive wastewater discharge.

Exemplary Embodiment 2

Treatment of salt-containing industrial wastewater by disc-type electrocatalytic reactor with titanium anode having coating of lead oxide (a) The cathode plate 8 is a stainless steel cathode platen, and the anode plate 9 is a titanium anode with coating of lead oxide.

(b) Utilize a multi-stage centrifugal pump to pump salt-containing industrial wastewater into the water inlet 12 at a flow rate of 2 m/s, and the fluid flows through the passage holes peripheral to the central hole of the cathode plate 8 to form an in-and-out circulating flow.

(c) Adjust an applied electric field voltage to 3.0V and a current density to 20 mA/cm$^2$.

(d) Take a sample from the water outlet 11 after 1 hour of stable operation and detect water color, ammonia nitrogen, and COD indicators.

For the inlet water, the COD is 483 mg/L and the ammonia nitrogen is 232 mg/L. After treatment, the chromaticity in the water can be completely removed, the effluent COD is reduced to 45 mg/L, and the ammonia nitrogen is reduced to 1 mg/L, reaching the first-level standard for comprehensive wastewater discharge.

Exemplary Embodiment 3

(a) The cathode plate 8 is a stainless steel cathode platen, and the anode plate 9 is a titanium anode with coating of antimony-tin oxide.

(b) Utilize a multi-stage centrifugal pump to pump salt-containing industrial wastewater into the water inlet 12 at a flow rate of 3 m/s, and the fluid flows through the passage holes peripheral to the central hole of the cathode plate 8 to form an in-and-out circulating flow.

(c) Adjust an applied electric field voltage to 4.0V and a current density to 30 mA/cm$^2$.

(d) Take a sample from the water outlet 11 after 1 hour of stable operation and detect water color, ammonia nitrogen, and COD indicators.

For the inlet water, the COD is 483 mg/L and the ammonia nitrogen is 232 mg/L. After treatment, the chromaticity in the water can be completely removed, the effluent COD is reduced to 42 mg/L, and the ammonia nitrogen is reduced to 1.2 mg/L, reaching the first-level standard for comprehensive wastewater discharge.

Exemplary Embodiment 4

Treatment of salt-containing industrial wastewater by disc-type electrocatalytic reactor with titanium anode having coating of yttrium oxide (a) The cathode plate 8 is a stainless steel cathode platen, and the anode plate 9 is a titanium anode with coating of yttrium oxide.

(b) Utilize a multi-stage centrifugal pump to pump salt-containing industrial wastewater into the water inlet 12 at a flow rate of 5 m/s, and the fluid flows through the passage holes peripheral to the central hole of the cathode plate 8 to form an in-and-out circulating flow.

(c) Adjust an applied electric field voltage to 4.0V and a current density to 30 mA/cm$^2$.

(d) Take a sample from the water outlet 11 after 1 hour of stable operation and detect water color, ammonia nitrogen, and COD indicators.

For the inlet water, the COD is 483 mg/L and the ammonia nitrogen is 232 mg/L. After treatment, the chromaticity in the water can be completely removed, the effluent COD is reduced to 48 mg/L, and the ammonia nitrogen is reduced to 1.2 mg/L, reaching the first-level standard for comprehensive wastewater discharge.

Exemplary Embodiment 5

Treatment of salt-containing industrial wastewater by disc-type electrocatalytic reactor with titanium anode having coating of platinum (a) The cathode plate 8 is a stainless steel cathode platen, and the anode plate 9 is a titanium anode with coating of platinum.

(b) Utilize a multi-stage centrifugal pump to pump salt-containing industrial wastewater into the water inlet 12 at a flow rate of 5 m/s, and the fluid flows through the passage holes peripheral to the central hole of the cathode plate 8 to form an in-and-out circulating flow.

(c) Adjust an applied electric field voltage to 4.0V and a current density to 30 mA/cm$^2$.

(d) Take a sample from the water outlet 11 after 1 hour of stable operation and detect water color, ammonia nitrogen, and COD indicators.

For the inlet water, the COD is 483 mg/L and the ammonia nitrogen is 232 mg/L. After treatment, the chromaticity in the water can be completely removed, the effluent COD is reduced to 46 mg/L, and the ammonia nitrogen is reduced to 1.4 mg/L, reaching the first-level standard for comprehensive wastewater discharge.

Exemplary Embodiment 6

Treatment of salt-containing industrial wastewater by disc-type electrocatalytic reactor with titanium anode having coating of composite oxide of platinum, iridium and ruthenium (a) The cathode plate 8 is a stainless steel cathode platen, and the anode plate 9 is a titanium anode with coating of coating of composite oxide of platinum, iridium and ruthenium.

(b) Utilize a multi-stage centrifugal pump to pump salt-containing industrial wastewater into the water inlet 12 at a flow rate of 3 m/s, and the fluid flows through the passage holes peripheral to the central hole of the cathode plate 8 to form an in-and-out circulating flow.

(c) Adjust an applied electric field voltage to 4.0V and a current density to 30 mA/cm$^2$.

(d) Take a sample from the water outlet 11 after 1 hour of stable operation and detect water color, ammonia nitrogen, and COD indicators.

For the inlet water, the COD is 483 mg/L and the ammonia nitrogen is 232 mg/L. After treatment, the chromaticity in the water can be completely removed, the effluent COD is reduced to 40 mg/L, and the ammonia nitrogen is reduced to 1.0 mg/L, reaching the first-level standard for comprehensive wastewater discharge.

Accordingly, the results of treated salty industrial wastewater show that the method has good electrocatalytic oxidation ability, can significantly improve the removal efficiency of chroma, ammonia nitrogen and COD in high-salt wastewater, and make the effluent reach the first-level standard of comprehensive wastewater discharge.

There are various technical inspirations for the technical solutions described in the present invention, and the theoretical basis for the alternatives is:

The anode plate 9 used in the examples given in the present invention is iridium oxide, ruthenium oxide, iridium-ruthenium alloy oxide, platinum-iridium-ruthenium alloy oxide, lead oxide, antimony-tin oxide or platinum coated titanium electrode. The material of the cathode plate 8 is titanium, stainless steel, aluminum. Thus, it is inferred that when the anode plate 9 uses other types of electrodes (such as carbon cloth, carbon fiber, graphite electrode, etc.), the cathode plate 8 can also use other types of electrodes (such as carbon cloth, carbon fiber, graphite electrode, etc.) to achieve the technical effect of the present invention.

The disc electrode assembly method in the embodiment of the present invention is an improved manner of electrode arrangement, and those skilled in the art can obtain technical inspiration according to the technical solution provided by the embodiment of the present invention, by changing the disc structure and operation mode to achieve the technical effect of the present invention.

In the method of the present invention, the anode plate 8 and the cathode plate 9 adopt a staggered lamination method, and those skilled in the art can obtain technical inspiration according to the technical solution provided by the present invention, and adopt different arrangement methods to achieve the same technical effect.

What is claimed is:

1. A disc type electrocatalytic water treatment device, characterized in that, comprising: a housing (7) having a water inlet (12) and a water outlet (11), a plurality of cathode plates (8) and anode plates (9) sequentially an alternately stacked inside the housing (7), wherein each of the cathode plate (8) and anode plate (9) has a central hole (22), a central shaft (16) passes through the central hole to position and compress the cathode plates (8) and the anode plates (9) to form a disc-shaped structure and to separate the cathode plate (8) and the anode plate (9) at the central hole (22), thereby a waste water to be treated is guided to enter from the water inlet (12), flow inwardly and outwardly to sequentially pass through the cathode plate (8) and the anode plate (9) such that a passage route is formed, and finally flows out from the water outlet (11), the cathode plate (8) has an outer diameter greater than an outer diameter of the anode plate (9), the cathode plate (8) has a plurality of passage holes (23) such that the waste water to be treated flows in from the water inlet (12) and sequentially passes through the passage holes (23) and the outer edges of the anode plate (9) to form the passage route, and then flows out from the water outlet (11), each of the cathode plate (8) has an outer edge (81) with a protruded portion (811), the outer edges of two adjacently positioned cathode plates (8) are pressed to connect together through the protruded portions (811) to form an enclosed cavity (82), and the anode plate (9) is positioned inside the enclosed cavity (82).

2. A disc type electrocatalytic water treatment device, characterized in that: comprising: a housing (7) having a water inlet (12) and a water outlet (11), a plurality of cathode plates (8) and anode plates (9) sequentially an alternately stacked inside the housing (7), wherein each of the cathode plate (8) and anode plate (9) has a central hole (22), a central shaft (16) passes through the central hole to position and compress the cathode plates (8) and the anode plates (9) to form a disc-shaped structure and to separate the cathode plate (8) and the anode plate (9) at the central hole (22), thereby a waste water to be treated is guided to enter from the water inlet (12), flow inwardly and outwardly to sequentially pass through the cathode plate (8) and the anode plate (9) such that a passage route is formed, and finally flows out from the water outlet (11), the cathode plate has an outer diameter greater than an outer diameter of the anode plate, the cathode plate has a plurality of passage holes such that the waste water to be treated flows in from the water inlet and sequentially passes through the passage holes and the outer edges of the anode plate to form the passage route, and then flows out from the water outlet, each of the anode plate has an outer edge with a protruded portion, the outer edges of two adjacently positioned anode plates are pressed to connect together through the protruded portions to form an enclosed cavity, and the cathode plate is positioned inside the enclosed cavity.

3. A disc type electrocatalytic water treatment device, characterized in that: comprising: a housing (7) having a water inlet (12) and a water outlet (11), a plurality of cathode plates (8) and anode plates (9) sequentially an alternately stacked inside the housing (7), wherein each of the cathode plate (8) and anode plate (9) has a central hole (22), a central shaft (16) passes through the central hole to position and compress the cathode plates (8) and the anode plates (9) to form a disc-shaped structure and to separate the cathode plate (8) and the anode plate (9) at the central hole (22), thereby a waste water to be treated is guided to enter from the water inlet (12), flow inwardly and outwardly to sequentially pass through the cathode plate (8) and the anode plate (9) such that a passage route is formed, and finally flows out from the water outlet (11), wherein the central shaft (16) is a conductor, and a portion of the central shaft (16) which is located in the housing (7) is covered with an insulating washer (14), wherein the anode plate (9) is secured into position through the central shaft (16) and is sealed by a second sealing ring (10) and an insulation ring (17), and is electrically connected through connecting to a copper ring (18) to form an anode conductive loop.

4. The disc type electrocatalytic water treatment device according to claim 3, characterized in that: a conductive washer (15) is disposed between the insulating washer (14) and the central shaft (16), and the anode plate (9) penetrates through the insulating washer (14) to connect to the conductive washer (15) to form the anode conductive loop.

5. The disc type electrocatalytic water treatment device according to claim 4, characterized in that: a portion of the insulating washer (14) corresponding to the disc-shaped structure is provided with a second sealing ring (10), a first sealing ring (6) is provided between the end cap (5) and an inner wall of the housing (7), the first sealing ring (6) is a lip seal which fills in a groove of the end cap (5), the central shaft (16) has one end mounted with a sealing nut (1), an anode crimping washer (2) is disposed between the sealing nut (1) and the central shaft (16), an outer side of a portion of the central shaft (16) at the housing (7) is sleeved with an insulating sleeve (3) and an insulating washer (4), the insulating washer (4) is positioned between the insulating sleeve (3) and the conductive washer (15).

6. The disc type electrocatalytic water treatment device according to claim 4, characterized in that: the second sealing ring (10) is made of PVC, plastic, silicone rubber or tetrafluoroethylene, the insulating washer (14) is made of PVC, plastic, silicone rubber or tetrafluoroethylene, the conductive washer (15) is made of copper, stainless steel, aluminum or titanium, the first sealing ring (6) is made of PVC, plastic, silicone rubber or tetrafluoroethylene, the cathode plate (8) is made of stainless steel, aluminum or titanium, the anode plate (9) is made of iridium oxide, ruthenium oxide, iridium-ruthenium alloy oxide, platinum-iridium-ruthenium alloy oxide, lead oxide, antimony-tin oxide or platinum coated titanium electrode, the anode plate (9) is non-porous anode plate or porous anode plate.

7. The disc type electrocatalytic water treatment device according to claim 6, wherein the cathode plate has an outer diameter smaller than an outer diameter of the anode plate, the anode plate has a plurality of passage holes such that the water to be treated flows in from the water inlet and sequentially passes through the passage holes and the outer edges of the cathode plate to form the passage route, and then flows out from the water outlet.

8. The disc type electrocatalytic water treatment device according to claim 7, characterized in that: a conductive washer (15) is disposed between the insulating washer (14) and the central shaft (16), and the anode plate (9) penetrates through the insulating washer (14) to connect to the conductive washer (15) to form the anode conductive loop.

9. The disc type electrocatalytic water treatment device according to claim 8, characterized in that: a portion of the insulating washer (14) corresponding to the disc-shaped structure is provided with a second sealing ring (10), a first sealing ring (6) is provided between the end cap (5) and an inner wall of the housing (7), the first sealing ring (6) is a lip seal which fills in a groove of the end cap (5), the central shaft (16) has one end mounted with a sealing nut (1), an anode crimping washer (2) is disposed between the sealing nut (1) and the central shaft (16), an outer side of a portion of the central shaft (16) at the housing (7) is sleeved with an insulating sleeve (3) and an insulating washer (4), the insulating washer (4) is positioned between the insulating sleeve (3) and the conductive washer (15).

10. The disc type electrocatalytic water treatment device according to claim 8, characterized in that: the second sealing ring (10) is made of PVC, plastic, silicone rubber or tetrafluoroethylene, the insulating washer (14) is made of PVC, plastic, silicone rubber or tetrafluoroethylene, the conductive washer (15) is made of copper, stainless steel, aluminum or titanium, the first sealing ring (6) is made of PVC, plastic, silicone rubber or tetrafluoroethylene, the cathode plate (8) is made of stainless steel, aluminum or titanium, the anode plate (9) is made of iridium oxide, ruthenium oxide, iridium-ruthenium alloy oxide, platinum-iridium-ruthenium alloy oxide, lead oxide, antimony-tin oxide or platinum coated titanium electrode, the anode plate (9) is non-porous anode plate or porous anode plate.

11. The disc type electrocatalytic water treatment device according to claim 1, characterized in that: the central shaft (16) is a conductor, and a portion of the central shaft (16) which is located in the housing (7) is covered with an insulating washer (14), wherein the anode plate (9) is secured into position through the central shaft (16) and is sealed by a second sealing ring (10) and an insulation ring (17), and is electrically connected through connecting to a copper ring (18) to form an anode conductive loop.

12. The disc type electrocatalytic water treatment device according to claim 11, characterized in that: a conductive washer (15) is disposed between the insulating washer (14) and the central shaft (16), and the anode plate (9) penetrates through the insulating washer (14) to connect to the conductive washer (15) to form the anode conductive loop; and a portion of the insulating washer (14) corresponding to the disc-shaped structure is provided with a second sealing ring (10), a first sealing ring (6) is provided between the end cap (5) and an inner wall of the housing (7), the first sealing ring (6) is a lip seal which fills in a groove of the end cap (5), the central shaft (16) has one end mounted with a sealing nut (1), an anode crimping washer (2) is disposed between the sealing nut (1) and the central shaft (16), an outer side of a portion of the central shaft (16) at the housing (7) is sleeved with an insulating sleeve (3) and an insulating washer (4), the insulating washer (4) is positioned between the insulating sleeve (3) and the conductive washer (15).

13. The disc type electrocatalytic water treatment device according to claim 2, characterized in that: the central shaft (16) is a conductor, and a portion of the central shaft (16) which is located in the housing (7) is covered with an insulating washer (14), wherein the anode plate (9) is secured into position through the central shaft (16) and is sealed by a second sealing ring (10) and an insulation ring (17), and is electrically connected through connecting to a copper ring (18) to form an anode conductive loop.

14. The disc type electrocatalytic water treatment device according to claim 13, characterized in that: a conductive washer (15) is disposed between the insulating washer (14) and the central shaft (16), and the anode plate (9) penetrates through the insulating washer (14) to connect to the conductive washer (15) to form the anode conductive loop.

15. The disc type electrocatalytic water treatment device according to claim 14, characterized in that: a portion of the insulating washer (14) corresponding to the disc-shaped structure is provided with a second sealing ring (10), a first sealing ring (6) is provided between the end cap (5) and an inner wall of the housing (7), the first sealing ring (6) is a lip seal which fills in a groove of the end cap (5), the central shaft (16) has one end mounted with a sealing nut (1), an anode crimping washer (2) is disposed between the sealing nut (1) and the central shaft (16), an outer side of a portion of the central shaft (16) at the housing (7) is sleeved with an insulating sleeve (3) and an insulating washer (4), the insulating washer (4) is positioned between the insulating sleeve (3) and the conductive washer (15).

16. The disc type electrocatalytic water treatment device according to claim 14, characterized in that: the second sealing ring (10) is made of PVC, plastic, silicone rubber or tetrafluoroethylene, the insulating washer (14) is made of PVC, plastic, silicone rubber or tetrafluoroethylene, the conductive washer (15) is made of copper, stainless steel, aluminum or titanium, the first sealing ring (6) is made of PVC, plastic, silicone rubber or tetrafluoroethylene, the cathode plate (8) is made of stainless steel, aluminum or titanium, the anode plate (9) is made of iridium oxide, ruthenium oxide, iridium-ruthenium alloy oxide, platinum-iridium-ruthenium alloy oxide, lead oxide, antimony-tin oxide or platinum coated titanium electrode, the anode plate (9) is non-porous anode plate or porous anode plate.

17. The disc type electrocatalytic water treatment device according to claim 1, characterized in that: the waste water to be treated is guided to flow through the passage holes peripheral to the central hole of the cathode plate (8) at the uppermost position or the anode plate (9) at the uppermost position in an in-and-out and downwardly manner, the water outlet (11) is positioned at a bottom of the housing (7).

18. The disc type electrocatalytic water treatment device according to claim 2, characterized in that: the waste water to be treated is guided to flow through the passage holes peripheral to the central hole of the cathode plate (8) at the uppermost position or the anode plate (9) at the uppermost position in an in-and-out and downwardly manner, the water outlet (11) is positioned at a bottom of the housing (7).

* * * * *